United States Patent
Horii

(10) Patent No.: US 12,327,703 B2
(45) Date of Patent: Jun. 10, 2025

(54) RELAY MODULE AND RELAY TERMINAL BLOCK USING SAME

(71) Applicant: LAPLACE SYSTEM CO., LTD., Kyoto (JP)

(72) Inventor: Masayuki Horii, Kyoto (JP)

(73) Assignee: LAPLACE SYSTEM CO., LTD., Kyoto (JP)

( * ) Notice: Subject to any disclaimer, the term of this patent is extended or adjusted under 35 U.S.C. 154(b) by 663 days.

(21) Appl. No.: 17/593,995

(22) PCT Filed: Mar. 26, 2020

(86) PCT No.: PCT/JP2020/013754
§ 371 (c)(1),
(2) Date: Sep. 29, 2021

(87) PCT Pub. No.: WO2020/203672
PCT Pub. Date: Oct. 8, 2020

(65) Prior Publication Data
US 2022/0102100 A1 Mar. 31, 2022

(30) Foreign Application Priority Data
Mar. 29, 2019 (JP) .................. 2019-066496

(51) Int. Cl.
*H01H 47/00* (2006.01)
*H01R 13/66* (2006.01)

(52) U.S. Cl.
CPC ......... *H01H 47/004* (2013.01); *H01R 13/665* (2013.01)

(58) Field of Classification Search
CPC ........ H01H 47/004; H04B 1/40; H04B 1/401; H04B 1/44; H01R 13/665; G05B 19/0423
See application file for complete search history.

(56) References Cited

U.S. PATENT DOCUMENTS

| | | | |
|---|---|---|---|
| 5,032,820 A | | 7/1991 | Tanikawa et al. |
| 5,998,985 A | * | 12/1999 | Gallavan .................. H03M 1/56 324/133 |

(Continued)

FOREIGN PATENT DOCUMENTS

| | | |
|---|---|---|
| JP | S5833750 A | 2/1983 |
| JP | S6160198 A | 3/1986 |

(Continued)

OTHER PUBLICATIONS

Henry Choi "Bare metal code to read ADC on Zynq", https://henryomd.blogspot.com/2015/06/bare-metal-code-to-read-adc-on-zynq.html, 2015 (Year: 2015).*

(Continued)

*Primary Examiner* — Quoc Thai N Vu
(74) *Attorney, Agent, or Firm* — McCoy Russell LLP

(57) ABSTRACT

An object is to provide a relay module and a relay terminal block enabling reduction of the workload of a worker and realization of space saving. The relay terminal block is provided with a plurality of relay modules and a select signal generation device, and each relay module is provided with a selective signal transmission device. A plurality of input signal transmission wires are connected to each relay module. One input signal transmission wire is selected according to a select signal output from the select signal generation device, and a signal input to the selected input signal transmission wire is output via an output signal transmission wire. Further, the relay terminal block is provided with an input/output module and is capable of outputting signals input from the plurality of the input signal transmission wires as serial signals.

8 Claims, 10 Drawing Sheets

(56) References Cited

U.S. PATENT DOCUMENTS

| | | | | |
|---|---|---|---|---|
| 7,126,515 | B1* | 10/2006 | Kris | H03M 1/1225 |
| | | | | 341/155 |
| 2008/0320182 | A1* | 12/2008 | Rugo | G05B 19/054 |
| | | | | 710/100 |
| 2016/0014365 | A1 | 1/2016 | Mizuguchi | |

FOREIGN PATENT DOCUMENTS

| | | |
|---|---|---|
| JP | S61088400 A | 5/1986 |
| JP | H02284563 A | 11/1990 |
| JP | H04158224 A | 6/1992 |
| JP | H05314036 A | 11/1993 |
| JP | H06167362 A | 6/1994 |
| JP | H075992 A | 1/1995 |
| JP | H0727671 U | 5/1995 |
| JP | H0727671 Y2 | 6/1995 |
| JP | H1020879 A | 8/1998 |
| JP | H10208794 A | 8/1998 |
| JP | 2004265161 A | 9/2004 |
| JP | 2006338519 A | 12/2006 |
| JP | 2011178237 A | 9/2011 |
| JP | 2016019175 A | 2/2016 |
| JP | 2016054367 A | 4/2016 |
| JP | 2018042344 A | 3/2018 |

OTHER PUBLICATIONS

Texas Instruments, "8-Ch Isolated High Voltage Analog Input Module Reference Design", 2016 (Year: 2016).*

ISA Japan Patent Office, International Search Report Issued in Application No. PCT/JP2020/013754, Jun. 30, 2020, WIPO, 7 pages.

Japanese Patent Office, Office Action Issued in Application No. 2020-560419, Jan. 5, 2021, 9 pages.

Japanese Patent Office, Office Action Issued in Application No. 2020-560419, Jan. 3, 2021, 9 pages.

Japanese Patent Office, Office Action Issued in Application No. 2020-560419, May 25, 2021, 8 pages.

Indonesian Patent Office, Office Action Issued in Application No. P00202107827, Aug. 25, 2023, 6 pages.

Japanese Patent Office, Office Action Issued in Application No. 2021-034528, Nov. 28, 2023, 6 pages.

Japanese Patent Office, Office Action Issued in Application No. 2020-560419, Jan. 3, 2023, 9 pages.

Japanese Patent Office, Office Action Issued in Application No. 2020-560419, May 25, 2023, 8 pages.

Intellectual Property Office of Singapore, Written Opinion Issued in Application No. 11202110391Y, Jun. 28, 2022, 49 pages.

Japanese Patent Office, Office Action Issued in Application No. 2021-034528, May 7, 2024, 8 pages.

\* cited by examiner

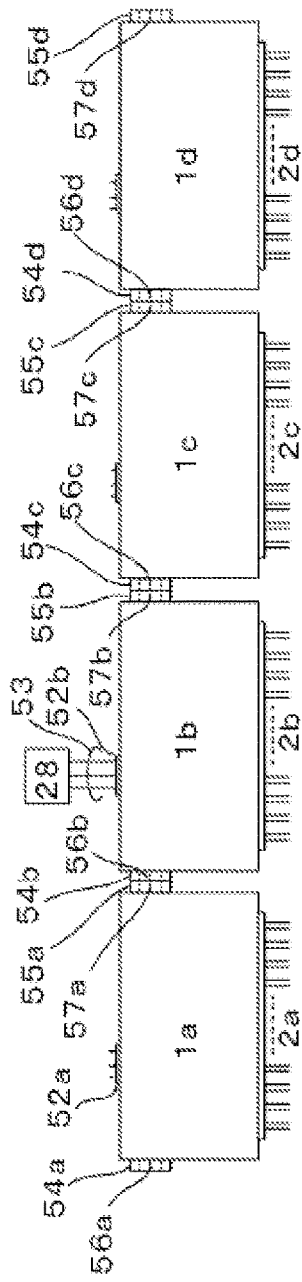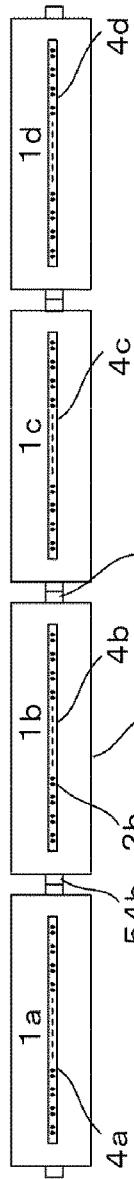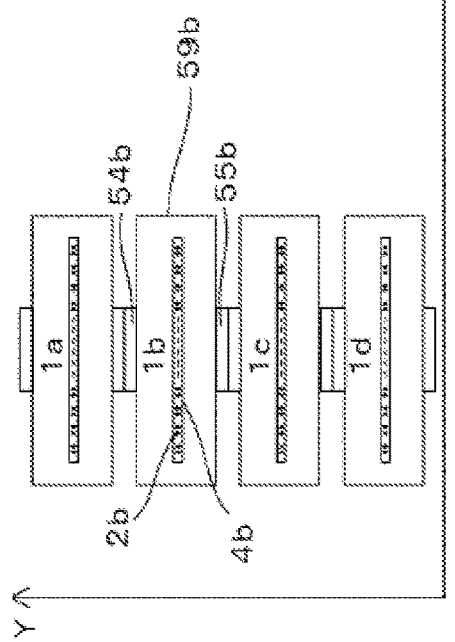

RELAY MODULE AND RELAY TERMINAL BLOCK USING SAME

CROSS REFERENCE TO RELATED APPLICATIONS

The present application is a U.S. National Phase of International Application No. PCT/JP2020/013754 entitled "RELAY MODULE AND RELAY TERMINAL BLOCK USING SAME," and filed on Mar. 26, 2020. International Application No. PCT/JP2020/013754 claims priority to Japanese Patent Application No. 2019-066496 filed on Mar. 29, 2019. The entire contents of each of the above-listed applications are hereby incorporated by reference for all purposes.

TECHNICAL FIELD

The present disclosure relates to a relay terminal block used for a monitoring system and the like.

BACKGROUND ART

In a known monitoring system for monitoring states of various apparatuses at a site, signal wires for transmitting data such as contact signals from the apparatuses can be connected to a terminal in a central monitoring room, a measuring instrument (for example, a data logger) or the like to perform remote monitoring, analysis and the like of the apparatuses. In this case, in order to relay the many signal wires used, a relay terminal block may be installed between the apparatuses and the terminal or the like in the monitoring room.

CITATION LIST

Patent Literature

Patent Literature 1: Japanese Patent Laid-Open No. H10-208794
Patent Literature 1: Japanese Utility Model Publication No. H7-27671

SUMMARY OF DISCLOSURE

Technical Problem

When the number of apparatuses for which monitoring and the like should be performed increases, the number of signal wires for transmitting various kinds of data from the apparatuses increases. For example, in a large-scale business facility or the like, the number of wire connections from apparatuses to a relay terminal block and from the relay terminal block to terminals in a monitoring room may sometimes become a huge number such as hundreds or thousands. Further, a plurality of kinds of data may be transmitted from the apparatuses.

When the number of connections of signal wires increases, the area occupied to install the relay terminal block increases, and the burden of wire connection work and work for confirming the state of coupling between signal wires on the input side and the output side of the relay terminal block on a worker increases. As a result, there arise problems of securing of a large installation space for the relay terminal block and increase in time and costs required for the wire connection work.

In view of the above problems, a main object of the present disclosure is to provide a relay module enabling reduction of the workload of a worker and realization of space saving for a relay terminal block, and a relay terminal block using the relay module.

Solution to Problem

A relay module (1) according to the present disclosure is a relay module relaying and outputting a plurality of signals input from outside, the relay module including:
 a plurality of input signal transmission wires (5S);
 a selective signal transmission device (6);
 a select signal transmission wire (137); and
 an output signal transmission wire (139), wherein
  the plurality of input signal transmission wires (5S) and the select signal transmission wire (137) are connected to the selective signal transmission device (6), and
  the selective signal transmission device (6) selects one of the plurality of input signal transmission wires (5S) according to a select signal input via the select signal transmission wire (137), and outputs a signal input to the selected input signal transmission wire (5S) via the output signal transmission wire (139).

By adopting such a configuration, it is possible to, by selecting one of signals input from a plurality of external apparatuses and outputting the signal to an output signal transmission wire, reduce the number of transmission wires on the output side, reduce the wire connection workload and work time of a worker, and enable miniaturization of a relay module.

Further, a commercially available multiplexer can be used as the selective signal transmission device, and it is possible to easily and inexpensively provide a relay module.

In the above configuration, the relay module (1) may be configured such that the relay module (1) further includes an ADC (14), wherein
 an output of the selective signal transmission device (6) is connected to the ADC (14), and
 an output of the ADC (14) is connected to the output signal transmission wire (139).

By adopting such a configuration, it is possible to convert an input analog signal to a digital signal, and it becomes easy to receive the output digital signal by a computer or the like (in a monitoring device, a measuring instrument or the like) and perform data processing.

In the above configuration, the relay module (1) may be configured such that the relay module (1) further includes photocouplers (16), wherein
 the input signal transmission wires (5S) are connected to the respective photocouplers (16), and
 outputs of the photocouplers (16) are connected to the selective signal transmission device (6).

By adopting such a configuration, it is possible to reduce noise of each signal wire input from outside.

In the above configuration, the relay module (1) further includes LED indicators (19), wherein
 the input signal transmission wires (5S) are connected to the respective LED indicators.

By adopting such a configuration, it is possible to visually confirm whether there is an input signal from outside or not, and the wire connection workload of the worker is reduced.

In the above configuration, the relay module (1) may be configured such that the relay module (1) further includes:
 a plurality of LEDs (41);
 a digital signal generation device (34); and
 a distribution device (38), wherein the distribution device (38) selects any of the LEDs (41) according to the select signal, and the digital signal generation device (34) outputs a signal to the selected LED (41).

By adopting such a configuration, it is possible to visually and easily confirm voltage of input signals from outside, from light emission states of the LEDs.

A relay terminal block (100) according to the present disclosure includes:

a plurality of the relay modules that are according to any of the above descriptions; and a select signal generation device (7), wherein the select signal generation device (7) outputs a select signal to the select signal transmission wires (137), and the select signal transmission wires (137) of the relay modules are mutually connected among the relay modules.

By adopting such a configuration, it becomes possible to easily increase the number of relay modules according to the number of signal wires input from outside, and it is possible to provide a highly expandable integrated relay terminal block (a relay unit) capable of flexibly responding.

Further, in the above configuration, the relay terminal block (100) may be configured such that the relay module (1) further includes an input/output module (20), wherein the input/output module (20) includes a select signal input port (23), a relay module signal input port (24) and a relay terminal block communication port (26), the select signal transmission wire (137) is connected to the select signal input port (23), the output signal transmission wires (139) of the plurality of relay modules are connected to the relay module signal input port (24), and the input/output module (20) outputs signals input to the plurality of input signal transmission wires (5S) from the relay terminal block communication port (26) as serial signals.

By adopting such a configuration, the configuration of the monitoring device, the measuring instrument or the like that receives an output signal from the relay terminal block becomes simple, and flexible response to extension of an input signal becomes possible.

Further, a relay module (1) according to the present disclosure is a relay module (1) relaying and outputting a plurality of signals input from outside, the relay module including a plurality of input signal transmission wires (5S), a first connector (54), a second connector (55), a third connector (52) and a controller, wherein the controller (51) enables signals input via the first connector (54), the second connector (55) and the input signal transmission wires (5S) to be serially output via the third connector (52) when recognizing that the relay module (1) is a master, and enables signals input via the input signal transmission wires (5S) to be serially output via the first connector (54) or the second connector (55) when recognizing that the relay module (1) is a slave.

Further, the relay module (1) according to the present disclosure recognizes that the relay module (1) is a master when detecting that there is external connection at the third connector (52), and recognizes that the relay module (1) is a slave when detecting that there is no external connection at the third connector (52).

By adopting such a configuration, it is possible to selectively set a function of the relay module, and it becomes possible to improve expandability.

Further, a relay terminal block (100) according to the present disclosure includes a plurality of the relay modules (1) described above, wherein at least the first connector (54) of each of the relay modules (1) is electrically connected to the second connector (55) of another relay module adjoining to the relay module (1), or the second connector (55) of the relay module (1) is electrically connected to the first connector (54) of another relay module adjoining to the relay module.

Further, in the relay terminal block (100) according to the present disclosure, one of the plurality of relay modules (1) electrically connected to one another via the first connector (54) or the second connector (55) is specified as a master relay module, and the other relay modules (1) are specified as slave relay modules, the slave relay modules serially output signals input via the input signal transmission wires (5S) to the master relay module side via the first connectors (54) or the second connectors (55), and the master relay module serially outputs signals input via the input signal transmission wires (5S) and input signals input via at least one of the first connector (54) and the second connector (55), via the third connector (52).

By adopting such a configuration, it is possible to obtain a highly expandable relay terminal block. Further, it is possible to reduce the workload of the worker.

Advantageous Effects of Disclosure

According to the present disclosure, it is possible to realize space saving for a relay module and a relay terminal block using the relay module, and reduce the burden of wire connection work on a worker.

BRIEF DESCRIPTION OF THE FIGURES

FIGS. 9a-9c is a diagram showing a connection relationship among the relay modules according to the sixth embodiment of the present disclosure.

DETAILED DESCRIPTION

Embodiments of the present disclosure will be explained below with reference to drawings. However, none of the embodiments is intended to give a limited interpretation in recognition of the spirit of the present disclosure. Further, the same members or members of the same type may be given the same reference sign, and explanation may be omitted.

First Embodiment

Figure 1A:
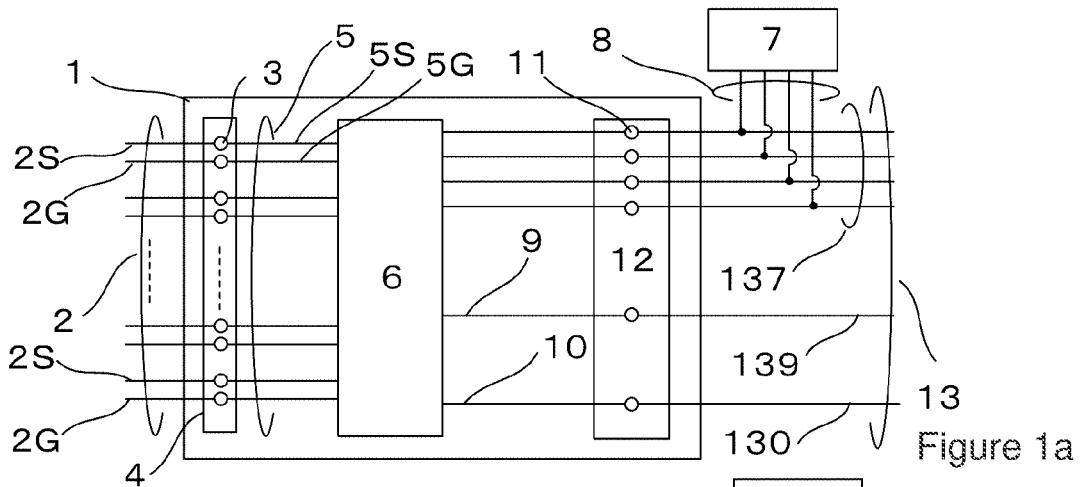
FIGS. 1a and 1b are configuration diagrams of a relay module according to a first embodiment of the present disclosure.
Figure 1B:
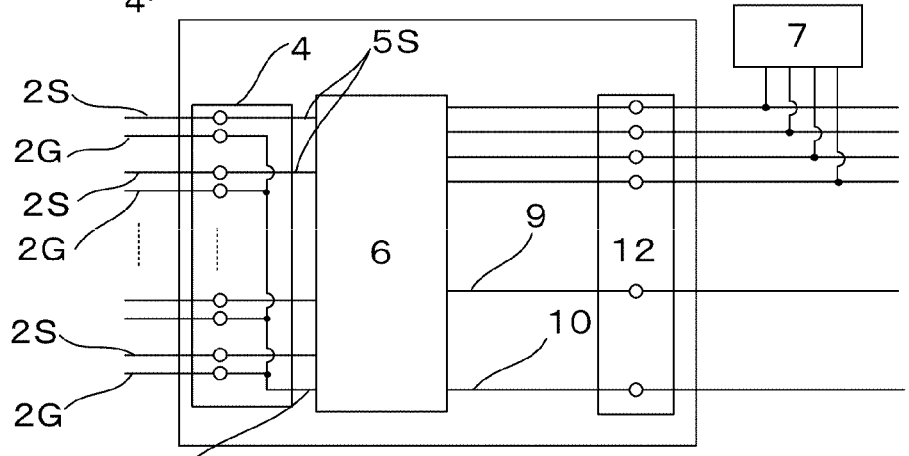
Figure 1C:
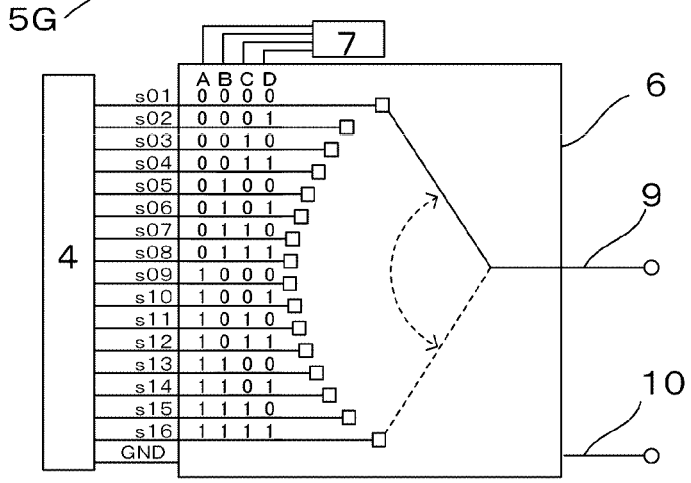
FIG. 1c is a schematic diagram illustrating a function of a selective signal transmission device.

FIGS. 1a-1c is a conceptual diagram showing a configuration of a relay module 1. The relay module 1 is incorporated, for example, on one substrate or in one case and is one basic component. Hereinafter, the same goes for other embodiments.

As shown in FIG. 1a, the relay module 1 is provided with an input terminal block 4 where terminals 3 for connecting external signal wires 2 for transmitting signals from various kinds of external apparatuses and the like are arrayed.

Each external signal wire 2 is configured with a pair of one external signal wire 2S and one ground wire 2G, and, for example, the external signal wires 2 including sixteen pairs configured with thirty-two transmission wires are connected to the input terminal block 4.

Connection wires 5 (input wires 5) are connected to the external signal wires 2 via the terminals 3 of the input terminal block 4, and accept (receive) signals from the various kinds of external apparatuses and the like transmitted via the external signal wires 2 (data communicating states of the apparatuses and the like). The external signal wires 2S are connected to input signal transmission wires 5S among the connection wires 5, and the ground wires 2G are connected to input signal ground wires 5G among the connection wires 5. The connection wires 5 are electrically connected to the input side (input ports) of a selective signal transmission device 6 (for example, a multiplexer), and signals from various kinds of apparatuses transmitted via the external signal wires 2 are input to the input side (the input ports) of the selective signal transmission device 6 as input signals via the connection wires 5.

A select signal generation device 7 generates a select signal for controlling the selective signal transmission device 6. The select signal generated by the select signal generation device 7 is an n-bit digital signal (n is an integer equal to or larger than 1) that changes periodically (in time division), and is input to control signal ports (control signal input terminals) of the selective signal transmission device 6 (in parallel) via n, for example, four connection wires 8.

Furthermore, an output signal wire 9 and a ground wire 10 are connected to the output side (output ports) of the selective signal transmission device 6, and one of the input signals is selected and output via the output signal wire 9 and the ground wire 10.

The relay module 1 is provided with an input/output terminal block 12 where a plurality of terminals 11 are arrayed, and the output signal wire 9 and the ground wire 10 are connected to terminals 11.

Further, the connection wires 8 for transmitting a select signal are electrically connected to terminals 11 of the input/output terminal block 12. The select signal is input to the selective signal transmission device 6 via the input/output terminal block 12 as described above.

Furthermore, output signal wires 13 are connected to the input/output terminal block 12, and, as a result, are connected to a terminal, a measuring instrument or the like in a monitoring room, so that it is possible to perform remote monitoring, data analysis and the like of situations about the apparatuses and the like.

The output signal wires 13 include select signal transmission wires 13T for outputting a select signal, an output signal transmission wire 13O (connected to the output signal wire 9) and a ground wire 13G (connected to the ground wire 10).

The connection wires 8 are connected to the respective select signal transmission wires 13T. The select signal transmission wires 13T are connected to the selective signal transmission device 6 via the input/output terminal block 12.

FIG. 1b shows a configuration example of wire connections on the input terminal block 4. The ground wires 2G of the external signal wires 2 are connected to one another and are further connected to one input signal ground wire 5G among the connection wires 5 to be connected to the selective signal transmission device 6. The external signal wires 2S of the external signal wires 2 are connected to the selective signal transmission device 6 via the input signal transmission wires 5S.

FIG. 1c is a schematic diagram illustrating a function of the selective signal transmission device 6.

The selective signal transmission device 6 is controlled by plural kinds of select signals generated by the select signal generation device 7. The select signal periodically changes and is input to the selective signal transmission device 6 via n, for example, four connection wires 8. Each connection wire 8 transmits a signal of "1" or "0", and a digital signal configured with any of $2^n$ combinations of "1" or "0" is transmitted to the selective signal transmission device 6 by n connection wires 8.

In the example shown in FIG. 1c, sixteen ($2^n=2^4$) kinds of signals each of which is a combination of "1" or "0" (select signals) are sequentially input to the selective signal transmission device 6 by four connection wires 8, periodically changing (in a cyclic manner; cyclically). The select signal generation device 7 outputs in a sequential and cyclic manner, for example, binary values of 0 to $2^n$ as parallel signals, as an n-bit signal at intervals of a predetermined period (for example, from 1 msec to 10 msec).

Note that n is not limited to 4.

One select signal is associated with each of the input signal transmission wires 5S connected to the selective signal transmission device 6, and only an input signal transmission wire 5S selected (specified) by a select signal is electrically connected to the output signal wire 9, and an input signal from the input signal transmission wire 5S is transmitted. When the combination of signals communicated by the four connection wires 8 is expressed as (A, B, C, D), for example, an input signal wire s01 among the input signal transmission wires 5S is electrically connected to the output signal wire 9 when (A, B, C, D) is (0, 0, 0, 0); and an input signal wire s02 is electrically connected when (A, B, C, D) is (0, 0, 0, 1). Then, each input signal is communicated to the output signal wire 9. The same applies hereinafter.

By using a commercially available multiplexer as the selective signal transmission device 6, the relay module 1 can be inexpensively and easily realized.

Further, the multiplexer can operate under an input voltage within a range from a predetermined negative voltage to a predetermined positive voltage and can output a selected input signal within the operating voltage range.

When an input signal exceeds the operating range of the multiplexer, an operational amplifier or the like may be appropriately added to the input side (for example, between the input terminal block 4 and the selective signal transmission device 6) to change an input signal fluctuation range.

A signal output from the relay module 1 is output to an external device (a monitoring device, a measuring instrument or the like) via the output signal wires 13. The output signal wires 13 include a total of n+2 transmission wires of the n (for example, four) select signal transmission wires 137, the one output signal transmission wire 139 and the one ground wire 130 from the selective signal transmission device 6.

By the selective signal transmission device 6, the number of the output signal transmission wires 139 can be reduced to $\frac{1}{2}^n$ relative to the number of the input signal transmission wires 5S. For example, if the number of the external signal wires 2 is thirty-two (sixteen pairs), and n=4 is satisfied, then the number of wires on the output side is reduced to 6 (=4+2). As a result, space saving of the relay module 1 and reduction in the workload of a worker become possible.

Further, since the number (and the mass) of the wires is reduced, weight saving of the relay module 1 is also possible.

The external device can identify a corresponding input signal wire, that is, an apparatus that transmits a signal to the input signal wire, by a select signal, and can monitor or measure each apparatus by a combination of an identified apparatus and an output signal.

Second Embodiment

When signals from apparatuses are analog signals, the analog signals can be converted to digital signals in the relay module 1 and output.

Figure 2A:
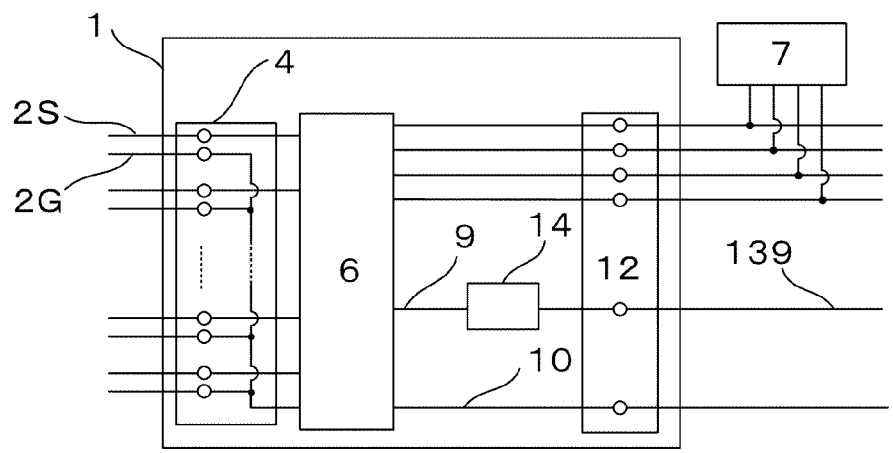
FIGS. 2a-2c are configuration diagrams of a relay module according to a second embodiment of the present disclosure.

FIG. 2a shows a configuration example in which an ADC 14 is connected to the output signal wire 9 of the selective signal transmission device 6.

When analog signals are input from the external signal wires 2, outputs of the selective signal transmission device 6 are connected to the ADC 14, and analog signals, which are output signals output from the output signal wire 9, are converted to digital signals by the ADC 14. Outputs of the ADC 14 are connected to the output signal transmission wire 139.

It is also possible to separately provide a plurality of ADCs for the external signal wires 2 (the input signal transmission wires 5S), and input outputs therefrom to the selective signal transmission device 6. However, signals input from the external signal wires 2 can be converted to digital signals by the one ADC 14 and output as shown in FIG. 2a, and relay module manufacturing costs can be reduced.

Figure 2B:
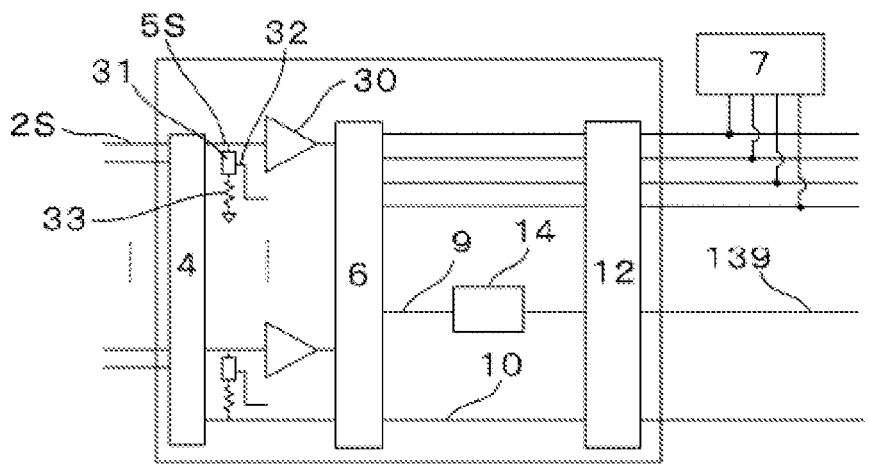

An operational amplifiers 30 may be provided for each of the external signal wires 2, as a voltage follower and outputs therefrom may be input to the selective signal transmission device 6 as shown in FIG. 2b. When an external signal wire 2 (an input signal transmission wire 5S) communicates a weak signal of a sensor or the like, the impedance of input to the selective signal transmission device 6 is increased, so that the analog signal can be prevented from changing. Further, the voltage of an input signal may be appropriately corrected by the operational amplifier 30 as necessary so that an output signal output from the output signal wire 9 (an output signal of the selective signal transmission device 6) is within the operating range of the ADC 14. According to the amount of the correction, an output signal from the output signal transmission wire 139 can be corrected by software on the monitoring device or measuring instrument side.

Further, a switch element 31, for example, a MOSFET and a load 33, for example, a resistive element of 250 [Ω] may be provided between the input signal transmission wires 5S and the ground wire 10, being arranged in series.

The switch element 31 can be electrically controlled by a select signal wire 32 to select an on (closed) state or an off (open) state. When the switch element 31 is off, electric signals from the external signal wires 2 (the input signal transmission wires 5S) are input directly to the operational amplifier 30. When the switch element 31 is on, current changes of the electric signals of the input signal transmission wires 5S can be converted to voltage changes by the load 33 and input to the operational amplifier 30. Therefore, it is possible to switch input between current and voltage according to the electric signals input from the external signal wires 2.

Though the voltage of the select signal wire 32 may be supplied from the external device (the monitoring device, the measuring instrument or the like), the voltage can be supplied from a power source installed in the relay module 1. Further, the switch element 31 may be a mechanical switch like a DIP switch instead of an electric switch like a MOSFET. The switch element 31 may be manually operated according to the specifications of the electric signals from the external signal wires 2.

The operational amplifier 30 and the current/voltage switching (the configuration with the switch element 31 and the load 33) are also applicable to the first embodiment.

Figure 2C:
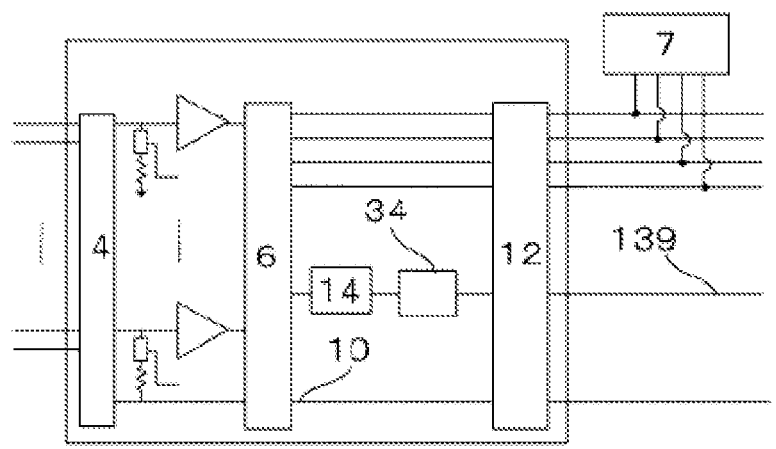

Further, an output of the ADC 14 may be input to an arithmetic processing device 34, for example, a microcomputer as shown in FIG. 2c. Voltage converted by the ADC 14 may be converted to a digital value by the arithmetic processing device 34. The voltage value converted to the digital value by the arithmetic processing device 34 is output to the output signal transmission wire 139 as a serial signal. The converted digital value may be output bit by bit as parallel signals.

In any of the cases of FIGS. 2a, 2b and 2c, it is necessary to select such an ADC 14 that the conversion speed is faster than the select signal period of the selective signal transmission device 6 or set the select signal period longer than the conversion time (sampling time) of the ADC 14. For example, if a time interval (a period) between select signals is set from 1 msec to 10 msec, the time period can be longer than the conversion time of a general ADC that is commercially available. The period, however, is not limited thereto.

Third Embodiment

The example shown in FIG. 1b is a configuration in which the ground wires 2G of the external signal wires 2 are short-circuited to obtain one common ground wire on the input terminal block 4. However, by the ground wires 2G connected to different apparatuses being short-circuited, there may be a case where signals may mutually interfere with one another, or noise may occur. Further, there may be a case where the electric potentials of the ground wires 2G are different.

In the present embodiment, it is possible to electrically separate the external signal wires 2 connected to different apparatuses and cause input signals to be input to the selective signal transmission device 6 without the input signals mutually interfering with one another.

Figure 3A:
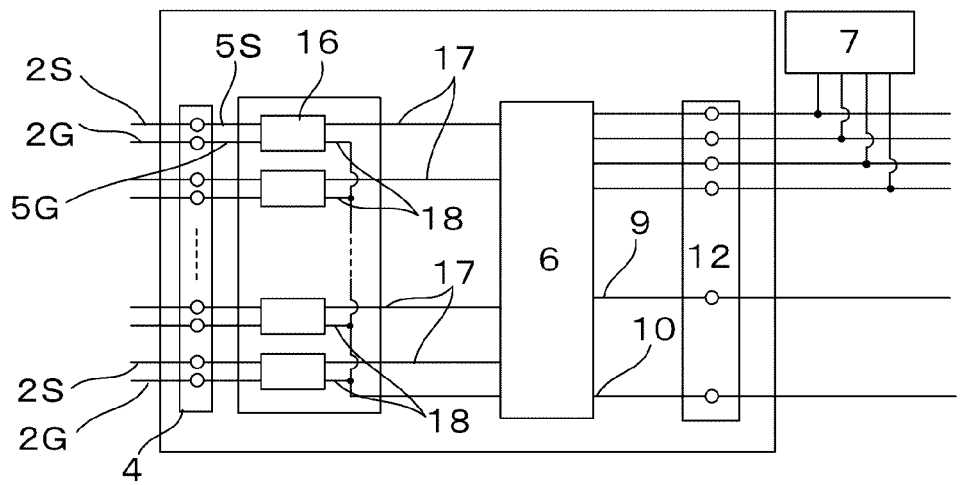
FIGS. 3a-3b are configuration diagrams of a relay module according to a third embodiment of the present disclosure.

As shown in FIG. 3a, the external signal wires 2 connected to the terminals 3 of the input terminal block 4 are input to respective photocouplers 16. Specifically, each of the external signal wires 2 is configured with a combination of an external signal wire 2S and a ground wire 2G as described above, and an input signal transmission wire 5S and an input signal ground wire 5G connected to the external signal wire 2S and the ground wire 2G, respectively, are connected to input terminals of a photocoupler 16.

From the photocouplers 16, signals are output according to (in proportion to) the voltages of input signals of the external signal wires 2.

Output signal wires 17 of the photocouplers 16 are input to the selective signal transmission device 6, and ground wires 18 of the photocouplers 16 are input to the selective signal transmission device 6, being short-circuited with one another.

The output signal wires 17 are for transmitting input signals to the selective signal transmission device 6 and, in that sense, each output signal wire 17 constitutes a part of an input signal transmission wire 5S.

The ground wires 2G (and the external signal wires 2S) of the external signal wires 2 are electrically separated from one another and do not interfere with one another.

Figure 3B:
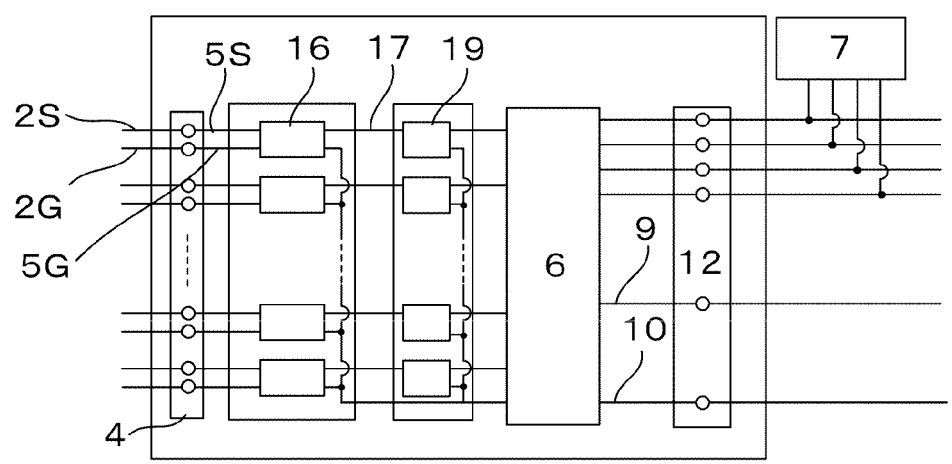

Further, LED indicators 19 may be arranged between the photocouplers 16 and the selective signal transmission device 6 as shown in FIG. 3b so that an LED may be lit up when it is detected that a signal is output to an output signal wire 17. It becomes possible to visually confirm states of input signals of the external signal wires 2.

By installing an LED between an output signal wire 17 and a ground wire 18, it is possible to, when an electric signal is input to an output signal wire 17, cause an LED to emit light.

Further, for example, comparators may be connected in parallel to the respective output signal wires 17, so that when the voltage of an output signal wire 17 is equal to or above a predetermined voltage (a reference voltage) according to the comparator, power is supplied to the LED to cause the LED to be lit up. Furthermore, a configuration is also possible in which, when voltage equal to or above the reference voltage is detected, the voltage is held by a latch circuit or the like only for a predetermined time, and power is supplied to the LED.

Further, it is also possible to, by sequentially inputting signals with voltages equal to or above the reference voltage to the external signal wires 2 as test signals, visually confirm the wire connection states of the input signals 2, and it is possible to reduce the workload of the wire connection worker.

A configuration is also possible in which only either the photocouplers 16 or the LED indicators 19 are installed. The configuration shown in the second embodiment may be combined.

Figure 4A:
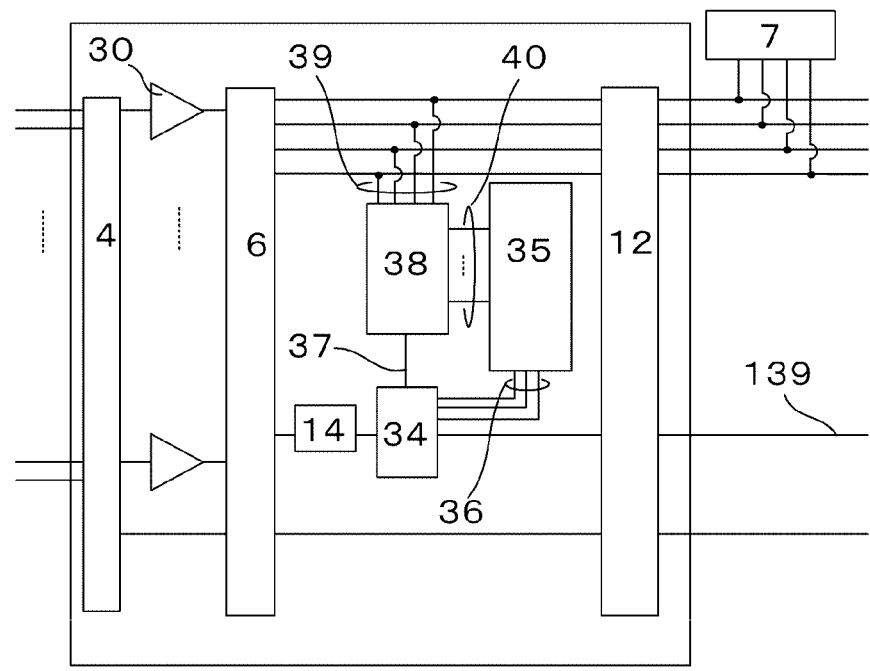
FIGS. 4a-4b is a configuration diagram of the relay module according to the third embodiment of the present disclosure.

As one embodiment, FIG. 4a shows an LED controller 35 provided on the output side of the arithmetic processing device 34 and using full-color LEDs, as an LED indicator 19.

An output of the ADC 14 has been input to the arithmetic processing device 34 (a digital signal generation device), and the arithmetic processing device 34 (uniquely) converts the voltage of the output signal of the ADC 14 to a digital numerical value and outputs a digital signal to a distribution device 38 (a demultiplexer) via an output wire 37. This can be realized, for example, by utilizing the principle of a known digital voltmeter and by using a microcomputer or the like as the arithmetic processing device 34, Furthermore, the arithmetic processing device 34 generates RGB signals, which are LED control signals, each of which is configured with a combination of "1 (H)" and "0 (L)", according to an input output voltage of the ADC 14.

For example, in order that red changes to white as the output voltage of the ADC 14 increases, the pulse widths at the H states of the RGB signals are controlled to generate the color signals as digital signals such that pulse duty ratios in proportion to light emission intensities of R (red), G (green) and B (blue) LEDs are obtained, and the digital signals are input to the LED controller 35 via RGB signal wires 36. A table of correspondence between voltage values and colors (combinations of RGB intensities) is stored in a storage device included in the arithmetic processing device 34 in advance, and a digital signal for setting each of the intensities of RGB can be generated according to the correspondence table.

As for the pulse ("1 (H)") of an output signal, a voltage higher than a threshold voltage for the LEDs is set to cause the LEDs to emit light.

A select signal has been input to the distribution device 38 (the demultiplexer) via select signal wires 39.

The distribution device 38 distributes output signals of the arithmetic processing device 34 according to select signals to output the output signals to the LED controller 35 via output wires 40. To the distribution device 38, select signals corresponding to $2^n$, for example, $2^4=16$ combinations, each of which is configured with n, for example, four signals of "1" or "0", are input via the select signal wires 39. The same number of the output signal wires 40 (distribution signal wires) as the number of combinations for the select signals are connected to the LED controller 35. One output signal wire 40 is selected for one combination for a select signal, and an output signal from the arithmetic processing device 34 is output to the LED controller 35 from the selected output signal wire 40.

Figure 4B:
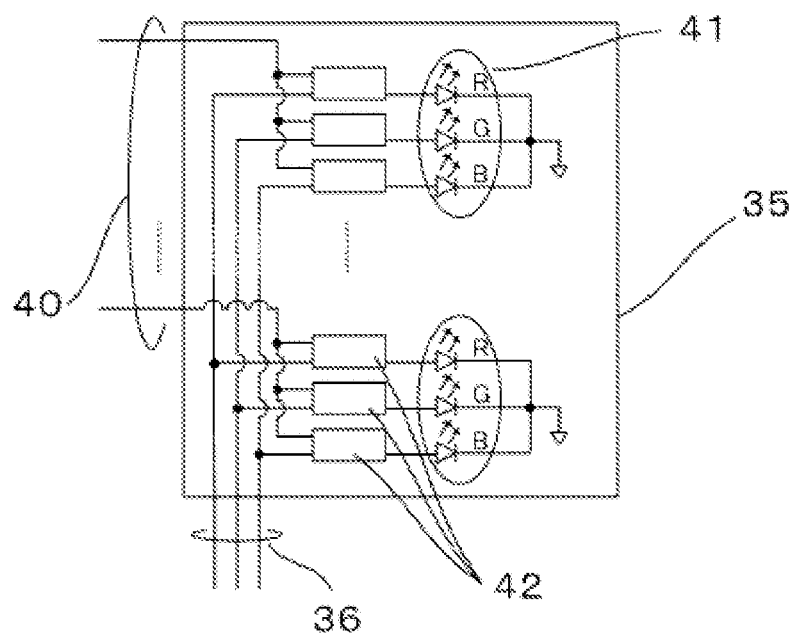

As shown in FIG. 4b, the LED controller 35 is provided with the same number ($2^n$) of full color LEDs 41 as the number of signal transmission wires 2S. Each full color LED 41 is configured with a set of LEDs of the three colors of RGB to enable light emission in desired color. The RGB signal wires 36 are connected to each full color LED 41 via switch elements 42 (LED opening/closing (switching) elements), for example, MOSFETs. One switch element 42 is provided for each of three R, G and B signals. Therefore, three switch elements 42 constitute one set. The $2^n$ output signal wires 40 are correspondingly connected to the $2^n$ sets of switch elements 42. Therefore, the same signal is input to one set of switch elements 42.

An output signal from the arithmetic processing device 34 is input to one set of switch elements 42 via one output signal wire 40 selected by a select signal, and only the set of switch elements 42 is turned on. Via the set of switch elements 42 that has been selected and turned on, three signals of R, G and B are input to the R, G and B LEDs of a corresponding full color LED 41 via the RGB signal wires 36. When the voltages of the R, G and B signals become higher than the threshold voltages of the corresponding LEDs (when the voltages become "1"), the LEDs emit light, and the full color LED 41 emits light in desired color.

That is, LED control signals (R, G and B signals) are output from the arithmetic processing device 34 to a full color LED 41 selected by the distribution device 38 according to a select signal, and the full color LED 41 emits light in color corresponding to the output voltage of the ADC 14.

For example, by arranging the full color LEDs 41 correspondingly to the input signal wires 2S, similarly to FIG. 3b, voltages input to the external signal wires 2S can be visually confirmed by emission colors of the LEDs.

A configuration is also possible in which single (single color) LEDs are used instead of the full color LEDs 41 so that voltages input to the input signal wires 2S can be visually confirmed by light emission intensities of the LEDs.

Fourth Embodiment

As for the relay module 1 in any of the above embodiments, it is possible to couple a plurality of relay modules 1, with each of them as one unit.

Figure 5:
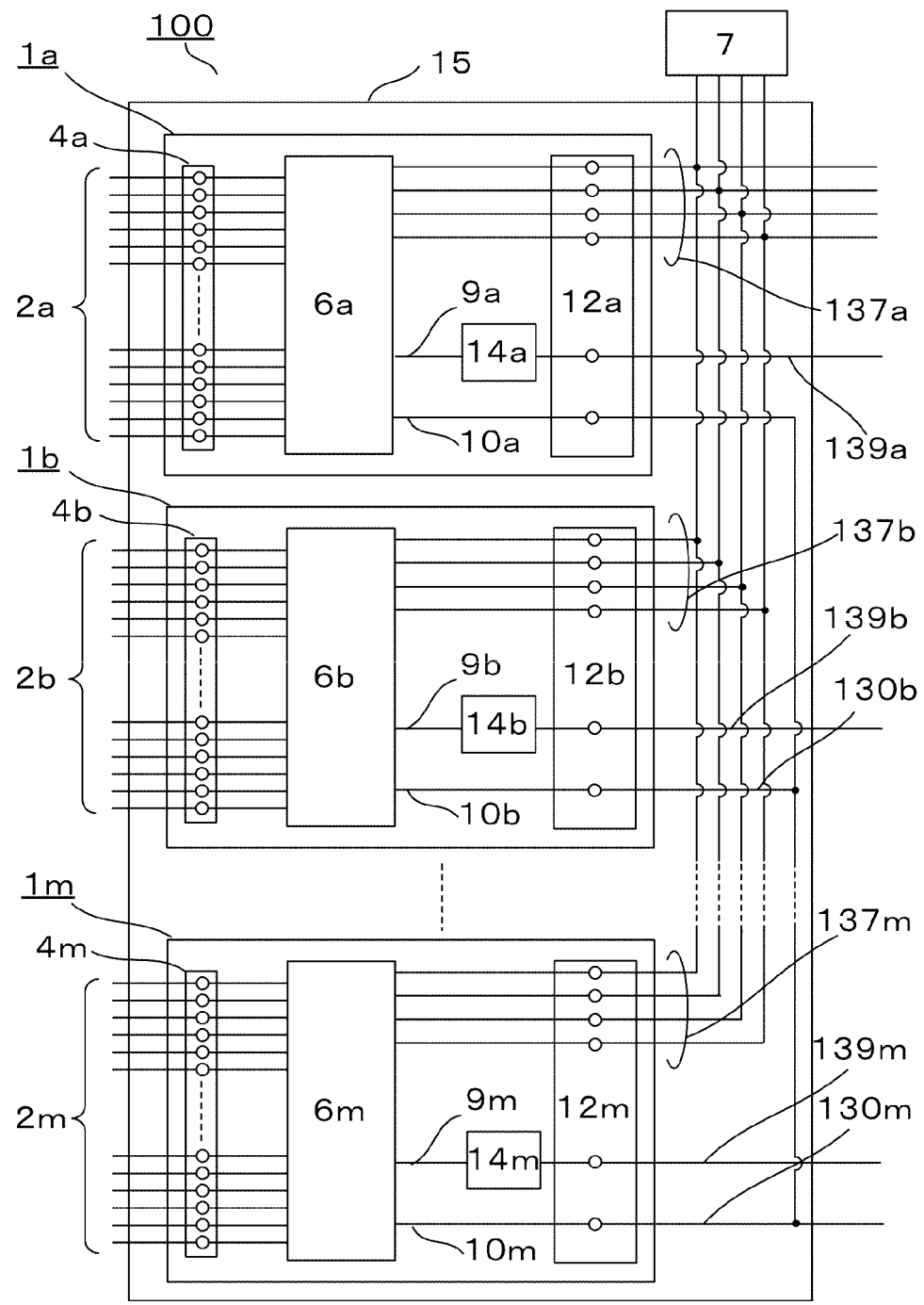
FIG. 5 is a configuration diagram of an integrated relay terminal block according to a fourth embodiment of the present disclosure.

FIG. 5 shows an example of a relay unit (a relay terminal block) 100 in which a plurality of relay modules 1 are coupled and integrated. In this case, the relay unit 100 is configured, with each relay module 1 as a subunit. Though the embodiment shown in FIG. 2b is illustrated as each of the relay modules 1 in FIG. 5, it is possible to adopt other embodiments.

As shown in FIG. 5, a conceptual diagram in which a plurality of relay modules 1a, 1b, . . . 1m constitute the relay unit 100 installed on one substrate 15 (or in a case) is shown. Any of the above embodiments can be adopted for each relay module 1.

The expression such as "1a, 1b, . . . 1m" shows that the number of relay modules 1 is not limited to three.

External signal wires 2a, 2b, . . . 2m are connected to the relay modules 1a, 1b, . . . , 1m, respectively, and output signal wires 9a, 9b, . . . 9m and ground wires 10a, 10b, . . . , 10m from selective signal transmission devices 6a, 6b, . . . 6m are connected to input/output terminal blocks 12a, 12b, . . . , 12m, respectively.

The ground wires 10a, 10b, . . . , 10m are connected to one another.

Further, select signal transmission wires 137a, 137b, . . . , 137m from the select signal generation device 7 are connected to the input/output terminal blocks 12a, 12b, . . . , 12m, respectively, and connected to one another.

By connecting terminals to which the select signal transmission wires 137a, 137b, . . . , 137m of the input/output terminal blocks 12a, 12b, . . . , 12m to one another (causing the terminals to be common) by wiring, it becomes possible to easily connecting the plurality of relay modules 1a, 1b, . . . , 1m.

That is, it becomes easy to expand the relay module 1 with the use of the input/output terminal block 12.

Wiring for outputting to a device that receives signals from the relay unit 100 (for example, the monitoring device, the measuring instrument or the like) includes one set of select signal transmission wires 137a, one ground wire 130m and output signal transmission wires 139a, 139b, . . . , 139m.

Any selected ones of the external signal wires 2a, the external signal wires 2b, . . . , or the external signal wires 2m are electrically connected to the respective output signal transmission wires 139a, 139b, . . . , 139m by the selective signal transmission devices 6a, 6b, . . . , 6m controlled by common select signals. As a result, signals output from the selected ones of the external signal wires 2a, the external signal wires 2b, . . . , or the external signal wires 2m are output from the respective output signal transmission wire 139a, 139b, . . . , 139m.

When the number of select signal transmission wires 137a is indicated by n, and the number of relay modules 1a, 1b, . . . , 1m is indicated by k, the number of transmission wires output from the relay unit 100 is indicated by n+1+k.

When n=4 is satisfied, and the number of the external signal wires 2 is thirty-two (sixteen pairs), the number of transmission wires on the output side of the relay unit 100, which includes ten (k=10) relay modules 1, is 4+1+10 relative to the 32×10 external signal wires 2, that is, the number can be reduced to approximately ¹⁄₂₀.

Therefore, the number of wire connections on the output side can be significantly reduced. As a result, the workload can be reduced, and the work time can be shortened. Furthermore, the wiring space on the output side can be saved, and miniaturization and weight saving of the relay unit 100 is possible.

Further, the above embodiments can be appropriately adopted according to the types, characteristics and the like of apparatuses to be connected, and characteristics of electric signals (for example, amplitudes of the signals and the like) input from the external signal wires 2, and it is also possible to collect relay modules 1a, 1b, . . . , 1m adopting different embodiments in one relay unit 100.

The relay module 1 may be provided for each individual place where apparatuses are placed, for example, such that the relay module 1a receives signals from apparatuses arranged in an area A, and the relay module 1b receives signals from apparatuses arranged in an area B. Further, the relay module 1 may be provided for each of apparatus types (or signal types such that the relay module 1a receives signals from apparatuses A, and the relay module 1b receives signals from apparatuses B.

To each input/output terminal block 12, the select signal transmission wires 137 for inputting a select signal and the output signal transmission wire 139 (and the ground wire 130) for outputting a signal from the selective signal transmission device 6 are collectively connected. However, since the select signal transmission wires 137 are connected among the relay modules 1a, 1b, . . . , 1m, terminal blocks for the select signal transmission wires 137 may be separately provided, being separated from the input/output terminal blocks 12 at positions suitable for the layout for arranging the relay modules 1a, 1b, . . . , 1m (for example, above and below each relay module 1 on the drawing) to facilitate connection.

Fifth Embodiment

Figure 6:
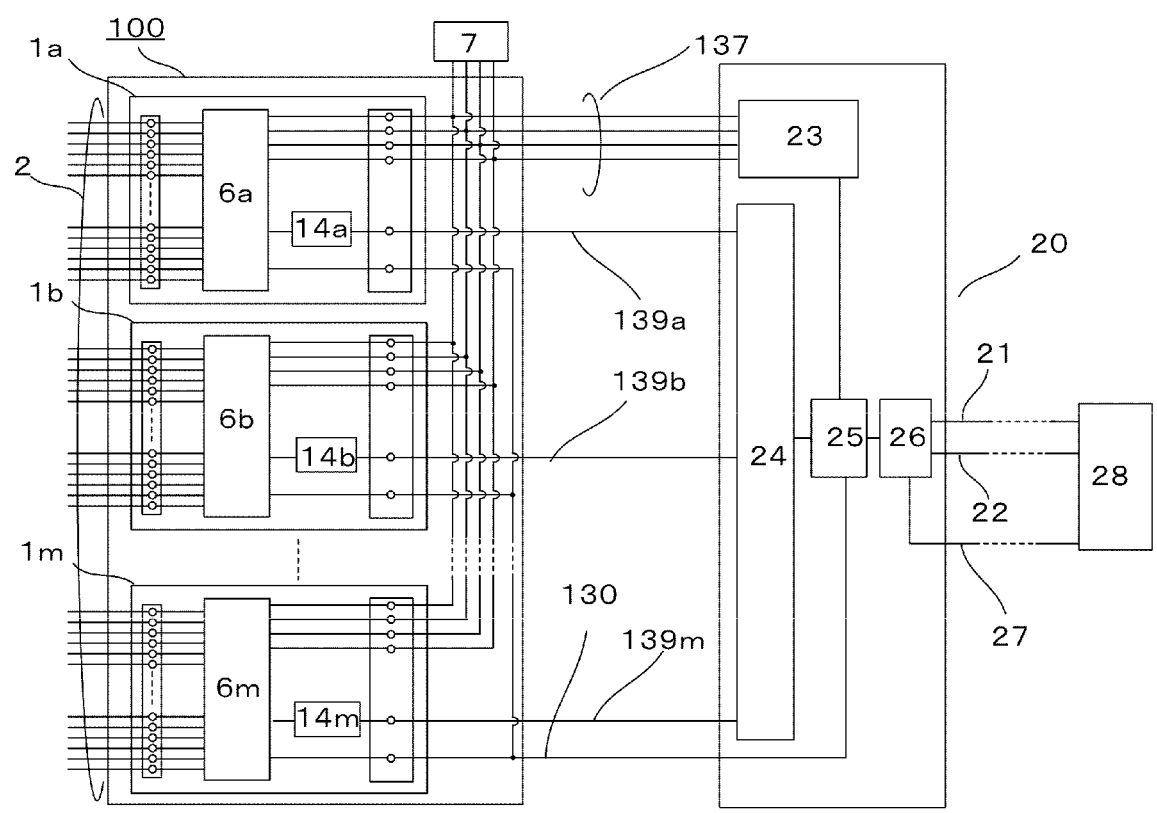
FIG. 6 is a configuration diagram of an integrated relay terminal block according to a fifth embodiment of the present disclosure.

As shown in FIG. 6, the relay unit (the relay terminal block) 100 can be further provided with an input/output module 20 to output serial signals. That is, in the present embodiment, one relay unit (a relay terminal block) is configured with a combination of the relay unit of the fourth embodiment and the input/output module.

In the fourth embodiment having expandability, signal wires output from the relay unit 100 are a plurality of select signal transmission wires 137, a ground wire 130 and output signal transmission wires 139a, 139b, . . . , 139m, and especially the number of the output signal transmission wires 139 changes according to the number of relay modules 1 for expansion.

Since the select signal transmission wires 137 and the ground wire 130 are used in common, indicators for distinguishing among the relay modules 1a, 1b, . . . , 1m are omitted.

On the monitoring device or measuring instrument side where processing (for example, monitoring or analysis) of output signals from the relay units 100 is performed, hardware input ports for receiving a plurality of output wires therefor are required. The number of input ports is required to be changed according to the number of relay modules 1 for expansion.

By the input/output module 20, signals of the plurality of select signal transmission wires 137 and the output signal transmission wires 139a, 139b, . . . , 139m can be output from one relay unit output wire (a relay terminal block output wire) 21. The ground wire 130 is connected to a ground wire 22.

The input/output module 20 associates select signals input from the select signal transmission wires 137 with signals input from the output signal transmission wires 139a, 139b, . . . , 139m of the respective relay modules 1a, 1b, . . . , 1m, and further associates combinations of a select signal and each of the relay module 1a, 1b, . . . , 1m with signals input from the respective output signal transmission wires 139a, 139b, . . . , 139m (which may be hereinafter referred to as data signals).

Since each select signal is n-bit information (data) as described above, the select signal can be identified, for example, by an identification number of a binary value from 0 to $2^n$. Therefore, each of signals input from the input signal wires 2 can be uniquely decided by a combination of an identification number of a select signal and an identification number identifying any of the output signal transmission wires 139a, 139b, . . . , 139m, that is, the relay modules 1a, 1b, . . . , 1m (for example, an integer number from 1 to k of the relay modules 1).

The input/output module 20 is provided with a select signal input port 23 to which the select signal transmission wires 137 are connected and a relay module signal input port 24 to which the output signal transmission wires 139a, 139b, . . . , 139m of the relay modules 1a, 1b, . . . , 1m are connected.

A select signal is input from the select signal input port 23, and signals from the relay modules 1a, 1b, . . . , 1m are input from the relay module signal input port 24.

Furthermore, the input/output module 20 is provided with an arithmetic processing unit 25. Each time a select signal is input (or changed), each of data signals (or content of the data signals, that is, pieces of data) input from the output signal transmission wires 139a, 139b, . . . , 139m and the value of the select signal (or a combination thereof) are once stored into a storage device of the arithmetic processing unit 25, and a combination of a select signal identification number, a relay module identification number and the data signal is sequentially output from the relay terminal block output wire 21 as digital signals.

The ADC 14 may be provided not in each relay module 1 but, for example, in the relay module signal input port 24 of the input/output module 20.

As for signals input from the input signal wires 2, the input signal wires 2 (or the apparatuses) are identified, and the signals can be output as serial signals by a relay terminal block communication port (a relay terminal block input/output port) 26 via the relay terminal block output wire 21.

Since each of the output serial signals is provided with a select signal identification number and a relay module identification number, each input signal wire 2 (or each apparatus) can be identified by software, and monitoring or analysis can be performed in a device that receives and analyzes the serial signal (the monitoring device or the measuring instrument).

For example, it becomes possible to easily perform monitoring and analysis by a commercially available personal computer or the like, and it becomes possible to, even if the number of the input signal wires 2 increases, and the number of the relay modules 1 increases, easily and flexibly respond thereto by minor changes of software and the like.

Further, the relay terminal block communication port 26 may be provided with a relay terminal block input wire 27.

The relay terminal block input wire 27 may be configured to receive a request signal from a device that receives signals transmitted from the relay unit 100 (the monitoring device or the measuring instrument) and output a signal corresponding to a select signal identification number and a relay module identification number specified by the request signal.

In this case, in response to the request signal input from the relay terminal block input wire 27, the arithmetic processing unit 25 may read data corresponding to the select signal identification number and the relay module identification number from data stored in the storage device and output the data from the relay terminal block communication port 26 via the relay terminal block output wire 21.

As shown in FIG. 6, the relay terminal block input wire 27, the relay terminal block output wire 21 and the ground wire 22 are connected to an external terminal 28 for monitoring or measurement, from the relay terminal block communication port 26. In the external terminal 28, combinations of a select signal identification number and a relay module identification number are associated with names or types of apparatuses at a site corresponding to the input signal wires 2, respectively, and registered, for example, as a database in a table format or the like, in a storage device included or externally attached to the external terminal 28. Data of each apparatus can be sequentially read by specifying a table number (a number allocated to the apparatus) of the registered database.

Figure 7:
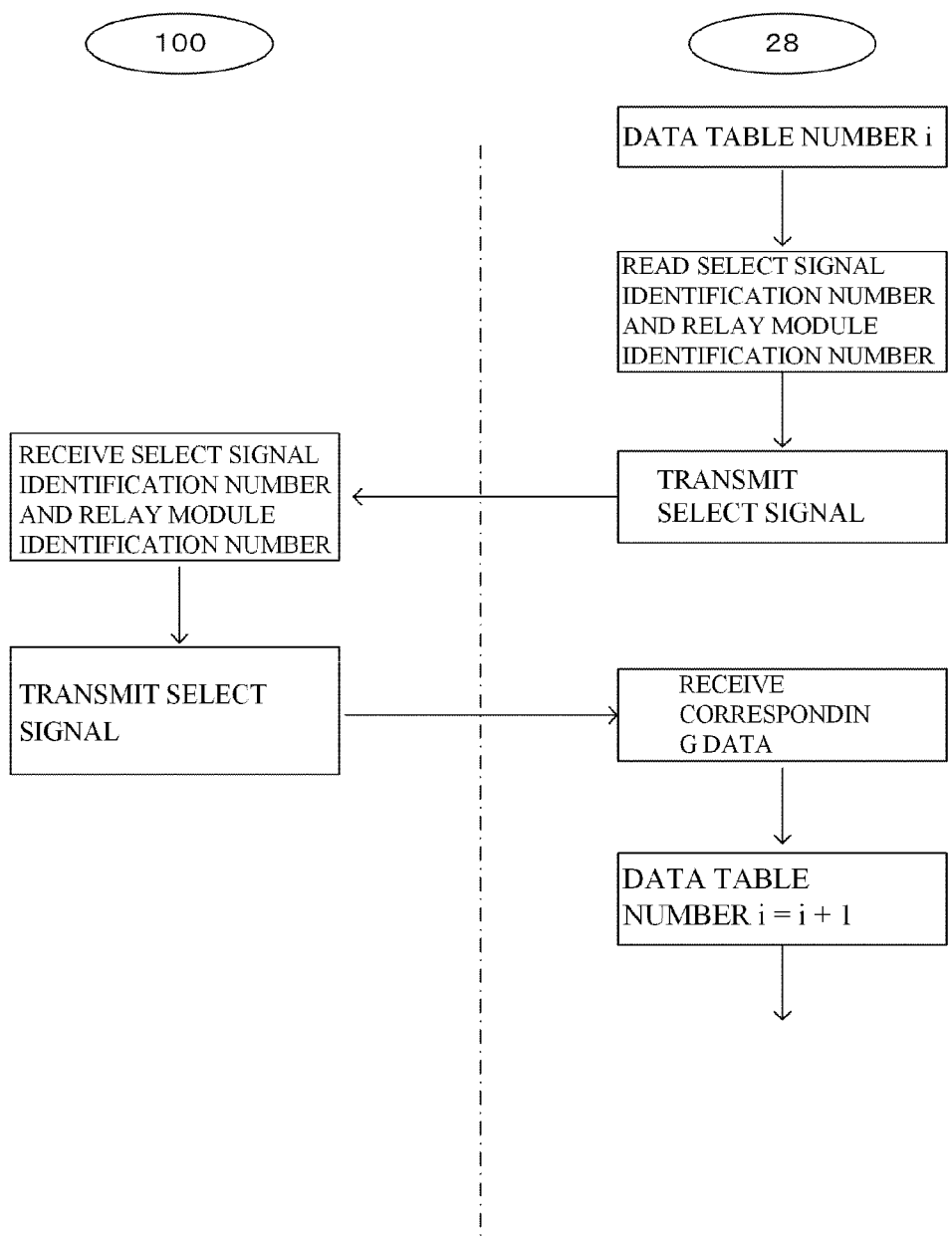
FIG. 7 is a flowchart of data communication using the integrated relay terminal block according to the fifth embodiment of the present disclosure.

FIG. 7 shows one method of use. As shown in FIG. 7, the external terminal 28 reads a select signal identification number and a relay module identification number corresponding to a table number i of the registered database from the storage device and transmits the select signal identification number and the relay module identification number to the relay unit 100 via the relay terminal block input wire 27.

The relay unit 100 reads data corresponding to the received combination of the select signal identification number and the relay module identification number from a storage device of the relay unit 100. The storage device may be a storage device included in each of the relay modules 1a, 1b, . . . , 1m, but a storage device common to the relay modules 1a, 1b, . . . , 1m may be included in the relay unit 100, for example, in the input/output module 20.

After that, the relay unit 100 transmits the read data to the external terminal 28. The external terminal 28 receives the data and appropriately performs storage, display, analysis or the like, associating the data with the combination of the select signal identification number and the relay module identification number. After that, the table number i is advanced by 1.

The table number i is sequentially advanced from 1 until the table number i is equal to the total number of input signals (pieces of input data) input from the input signal wires 2. When the table number i reaches the total number, i is returned to 1. Thus, by periodically changing the table number i, the state of each apparatus can be monitored or measured at any time.

Instead of periodically changing the table number, a required table number may be directly specified from the external terminal 28 to transmit a data transmission request to the relay unit 100.

Further, when the relay unit 100 transmits data in response to a request from the external terminal 27, only corresponding data may be transmitted without transmitting the combination of a select signal identification number and a relay module identification number.

FIG. 7 shows an example of a communication method, and the communication method is not limited thereto.

In all the embodiments, power for the selective signal transmission device 6, the select signal generation device 7, the ADC 14, the photocouplers 16, the LED indicators 19, the input/output module 20, the arithmetic processing device 34 and the like is supplied from a power source not shown. The power source may be included in each relay module 1, the relay unit 100 or the input/output module 20 or may be externally installed.

Sixth Embodiment

In the fifth embodiment shown in FIG. 6, the relay modules 1$a$, 1$b$, ..., 1$m$ can be included in the relay unit 100. By connecting the relay modules 1$a$, 1$b$, ..., 1$m$ to the relay unit 100 via the input/output terminal blocks 12, the number of relay modules can be easily increased.

According to the present sixth embodiment, it becomes possible to connect a plurality of relay modules 1 to one another and further improve expandability. Detailed explanation will be made below with reference to FIGS. 8$a$ and 8$b$.

Figure 8A:
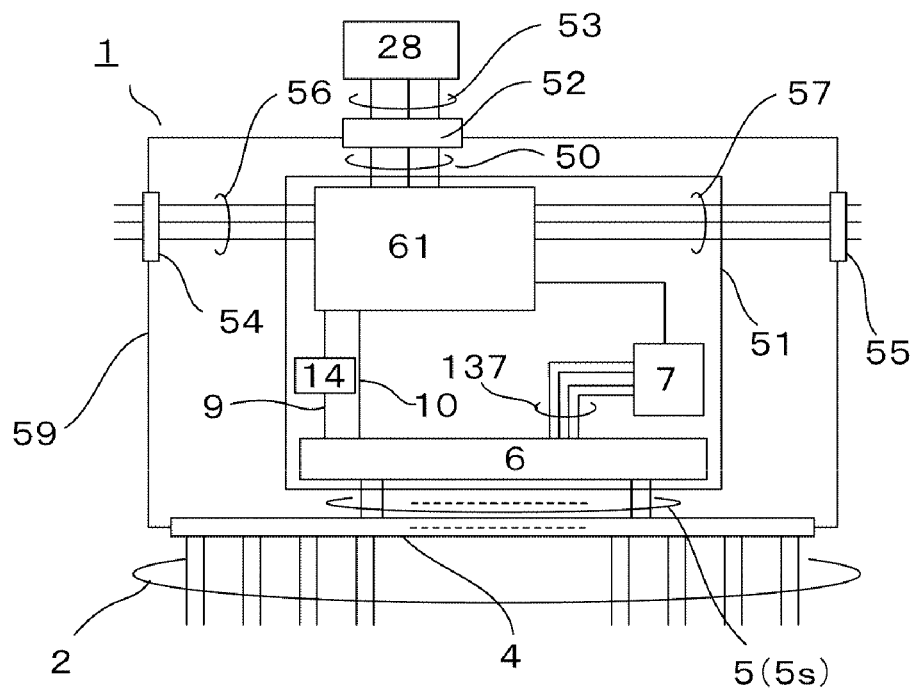
FIGS. 8a-8b are configuration diagrams of a relay module according to a sixth embodiment of the present disclosure.
Figure 8B:
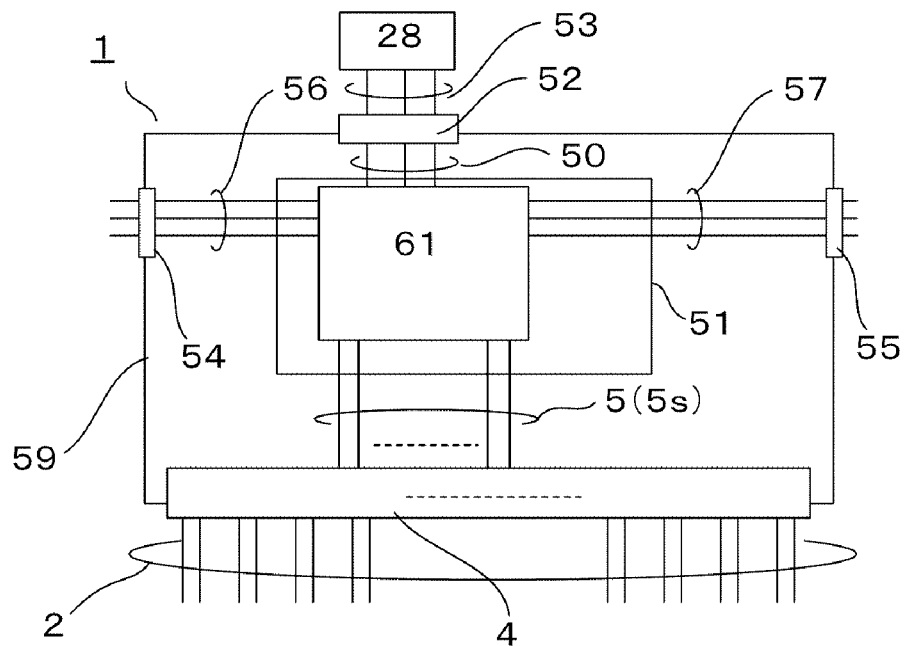

As shown in FIG. 8$a$, analog signals or digital signals are input from the input signal wires 2 connected to the input terminal block 4 and input to a controller 51 via the connection wires 5 (the input signal transmission wires 58). In the controller 51, the select signal generation device 6 outputs one input signal sequentially selected by the select signal generation device 7 to an arithmetic processing unit 61 via the ADC 14.

When the input signal is a digital signal, the ADC 14 can be omitted, and the input signal can be directly input to the arithmetic processing unit 61.

The arithmetic processing unit 61, the select signal generation device 6, the select signal generation device 7, the ADC 14 and the like, which are components of the relay module 1, are included in one case 59 and are easily carried and stored.

When the input signal is an analog signal, the voltage value of the input signal can be quantified and output as a digital numerical value. As a result, the relay module 1 measures the voltage of the input signal.

Further, it is also possible to, by quantifying a difference between potentials of both ends of a resistor with a known resistance value, as a digital numerical value by the ADC 14, measure the current value of the input signal by the relay module 1.

As already stated, the identification number of an input signal (an input signal wire) indicated, for example, by a binary number of 0 to $2^n$ can be identified from an output of the select signal generation device 7. In the configuration shown in FIG. 6, the identification number can be identified from an output of the select signal generation device 7 via the select signal input port 23. In comparison, in the configuration in FIG. 8$a$, the arithmetic processing unit 61 can identify the identification number of the input signal from an output of the select signal generation device 7. For example, the arithmetic processing unit 61 can include the function of the select signal input port 23. On the contrary, the arithmetic processing unit 61 can control the select signal generation device 7 to output an input signal corresponding to an identification number.

The arithmetic processing unit 61 has an input/output unit (an I/O unit), and a connector 52 that enables electrical connection between the arithmetic processing unit 61 and the external terminal 28 is fixed to the case 59. The arithmetic processing unit 61 is connected to the connector 52 by connection wires 50. The input/output unit can output each digitized input signal, associating the input signal with an identification number, to an external apparatus such as the external terminal 28 via a signal wire included in the connection wires 50 and a signal wire of an electric cable 53 connected to the connector 52. For example, an identification number can be added to the header of each input signal to sequentially output the input signal to the outside via the electric cable 53.

The arithmetic processing unit 61 may have a storage device. The digital value of each input signal may be temporarily stored, and the input signal may be sequentially output to the outside via the electric cable 53, being associated with an identification number.

Thus, the relay module 1 has a function of serially outputting signals input in parallel from the input signal wires 2 via the input signal transmission wires 5S.

Further, when input signals input from the external signal wires 2 are digital signals, the arithmetic processing unit 61 of the controller 51 may convert the input signals input in parallel via the input terminal block 4 and the connection wires 5 (the input signal transmission wires 5S) to serial signals, using neither the select signal generation device 6 nor the select signal generation device 7 (see FIG. 8$b$). In this case, for example, the arithmetic processing unit 61 is provided with a shift register so that the input signals can be converted to serial by the shift register.

In any of the configurations shown in FIGS. 8$a$ and 8$b$, the relay module 1 serially outputs a plurality of input signals input in parallel from the input signal transmission wires 58 to the external apparatus (the external terminal 28) via the connection wires 50 and the connector 52.

The electric cable 53 and the connection wires 50 individually include a power supply wire in addition to a signal wire, and power can be supplied to the relay module 1 from the external terminal 28 via the electric cable 53 and the connection wires 50.

When power is supplied to the arithmetic processing unit 61, the arithmetic processing unit 61 supplies power to the selective signal transmission device 6, the select signal generation device 7, the ADC 14 and the other electric devices (LEDs and the like) in the relay unit 100.

Thus, data communication and power supply can be performed via the electric cable 53 connecting the external terminal 28 and the relay module 1.

Furthermore, two connectors (connectors 54 and 55) are fixed to the case 59. As the connectors 54 and 55, for example, connectors in a male/female relationship can be used so that they are in a relationship that they can be fitted to each other. In this case, adjoining relay modules among the relay modules 1$a$, 1$b$, ..., 1$m$ can be easily mechanically connected and can be electrically connected by directly fitting and connecting the connector 54 and the connector 55 to each other.

The structures of the connectors 54 and 55 are not limited to the above. For example, the connectors 54 and 55 may be coupled with each other with an intermediate part between them.

The arithmetic processing unit 61 electrically connects the relay modules 1$a$, 1$b$, ..., 1$m$ with one another via interconnection cables 56 and 57 (connected to the connectors 54 and 55). For example, as shown in FIG. 9$a$, an interconnection cable 56$b$ of the relay module 1$b$ is connected to an interconnection cable 57$a$ of the relay module 1$a$ connected on the left side of FIG. 9$a$, and an interconnection cable 57$b$ of the relay module 1$b$ is connected to an interconnection cable 56$c$ of the relay module 1$c$ connected on the right side of FIG. 9$a$.

Between the adjoining relay modules 1$a$ and 1$b$, supply and reception of power are enabled by power wires included in the interconnection cables 56 and 57. For example, power can be supplied from the relay module 1b to which power has been supplied by the electric cable 53 via a connector 52b to the relay modules 1a and 1c via the interconnection cables 56b and 57b, respectively; and the relay modules 1a and 1c can receive the power via the interconnection cables 57a and 56c, respectively. Similarly, supply and reception of power between the relay module 1c and the relay module 1d can be performed via interconnection cables 57c and 56d. Thus, power supply is sequentially enabled among the relay modules 1.

Furthermore, signals can be input and output between the adjoining relay modules 1a and 1b via signal wires included in the interconnection cables 56 and 57. Unique device numbers (ID numbers) are allocated to the respective relay modules 1a, 1b, . . . 1m, so that mutual communication by signal wires is enabled.

A relay module 1 with the electric cable 53 connected to the connector 52 thereof (for example, the relay module 1b) is specified as a master (a parent device). For example, by the method described below, the relay module 1 detects that the electric cable 53 has been connected to the connector 52 thereof (hereinafter referred to as external connection) and recognizes that the relay module 1 is a master. As a result, the relay module 1b can be automatically specified as a master.

The electric cable 53 includes a signal wire for specifying a master (hereinafter referred to as a specification wire), and the specification wire is connected to the ground wire of the electric cable 53. The arithmetic processing unit 61 of the controller 51 of the relay module 1 to which the electric cable 53 is connected judges whether an input/output terminal of the arithmetic processing unit 61 connected to the specification wire is connected to the ground (short-circuited) or not (open-circuited). If the input/output terminal is connected to the ground, the controller 51 (the arithmetic processing unit 61) recognizes that the relay module 1 is a master. Otherwise, the controller 51 (the arithmetic processing unit 61) recognizes that recognizes that the relay module 1 is a slave (a child device).

Further, the arithmetic processing unit 61 may recognize whether the relay module 1 is a master or a slave depending on whether voltage is applied to the power source wire of the electric cable 53 or not.

Hereinafter, for simplification, a relay module specified as a master will be referred to as a master relay module, and other relay modules specified as slaves will be referred to as slave relay modules.

The master relay module 1b outputs the recognition result that the relay module 1b is a master, to the adjoining slave relay modules 1a and 1c via the interconnection cables 56b and 57b using the arithmetic processing unit 61b (see FIG. 9a).

The master relay module 1b may transmit a device number (an ID number) assigned to the master relay module 1b to communicate the recognition result that the relay module 1b is a master, to the slave relay modules 1a and 1c. However, particular signal wires (direction indication wires) may be provided in the interconnection cables 56b and 57b so that the relay module 1b may communicate the recognition result to the slave relay modules 1a and 1c by setting the direction indication wires, for example, to L (low level) or H (high level).

For example, in the case of transmitting serial signals from the slave relay modules 1a and 1c to the master relay module 1b, it is necessary for the slave relay modules 1a and 1c to recognize the position where the master relay module 1b is arranged. Therefore, the position (or the direction) of the master relay module 1b is communicated to the slave relay modules 1a and 1c using the interconnection cables 56 and 57 as shown below.

As shown in FIG. 9a, the slave relay module 1a (directly) inputs the master relay module 1b recognition result from the interconnection cable 56b of the master relay module 1b, which is connected to a connector 55a side (in the right direction of FIG. 9a) via the interconnection cable 57a. For example, the slave relay module 1a detects that the direction indication wire of the interconnection cables 56b is L via the interconnection cable 57a using the controller 51 (the arithmetic processing unit 61).

Therefore, the slave relay module 1a recognizes that the master relay module 1b exists on the connector 55a side. Then, the slave relay module 1a outputs the master relay module 1b recognition result to an interconnection cable 56a connected to the other connector 54a. For example, the direction indication wire of the interconnection cable 56a is set to L.

Similarly, the slave relay module 1c (directly) inputs the master relay module 1b recognition result from the master relay module 1b connected to a connector 54c side (on the interconnection cable 56c side) via the interconnection cable 56c. For example, it is detected that the direction indication wire of the interconnection cable 57b connected to a connector 55b is L, via the interconnection cable 56c.

Therefore, the slave relay module 1c recognizes that the master relay module 1b exists on the connector 54c side. Then, the slave relay module 1c sets the direction indication wire of the interconnection cable 57c connected to the other connector 55c to L.

Since the slave relay module 1d is not directly connected to the master relay module 1b, the slave relay module 1d cannot directly input the master relay module 1b recognition result. The slave relay module 1d can (indirectly) input the master relay module 1b recognition result from the slave relay module 1c connected to a connector 54d side (on the interconnection cable 56d side) via the interconnection cable 56d. That is, the slave relay module 1d recognizes that the master exists on the connector 54d side.

Then, the slave relay module 1d sets the direction indication wire of an interconnection cable 57d connected to the other connector 55d to L.

Thus, the slave relay modules 1a, 1c and 1d can recognize in which direction (on which of the connector 54 side and the connector 55 side) the master relay module 1b exists not only in the case of being directly connected to the master relay module 1b but also in the case of being indirectly connected to the master relay module via a slave relay module.

For convenience, for each slave relay module, a direction in which a master relay module exists will be referred to as upstream, and a direction far from the master relay module will be referred to as downstream.

Though FIG. 9a shows an example of the four relay modules 1a, 1b, 1c and 1d, the same goes for a case where an arbitrary number of relay modules 1 are coupled.

Thus, when the electric cable 53 is connected to any of the relay modules 1a, 1b, . . . , 1m, a relay module 1k to which the electric cable 53 is connected is recognized as a master, and the other relay modules 1a, 1b, . . . , 1m, which are slaves, can automatically and sequentially recognize in which direction the master relay module 1k is connected.

These operations can be executed by the arithmetic processing unit 61 in each relay module 1, and, for example, a microcomputer or a combination of a microcomputer, a storage device and the like can be used as the arithmetic processing unit 61.

When connection order of the relay modules 1a, 1b, . . . 1m to which device numbers (ID numbers) are assigned is decided in advance, each of the slave relay modules 1a, 1b, . . . , 1m may recognize the position of the master relay module 1k by inputting the device number (the ID number) of the master relay module 1k via the connectors 54 and 55. However, by grasping the direction of the master relay module 1k by the direction indication wire via the connectors 54 and 55 as described above, the worker does not have to connect the relay modules 1a, 1b, . . . , 1m in order decided in advance, and it is possible to reduce the workload of the worker at the site.

As described above, each relay module can detect whether there is external connection to the connector 52 or not and automatically recognize whether the relay module is a master or a slave; and a relay module that has recognized that the relay module is a slave can automatically recognize a direction in which a master relay module exists.

Therefore, the worker completes specification of relay modules as a master and slaves only by connecting the electric cable 53 to the connector 52.

It is also possible to make a configuration in which, for example, each arithmetic processing unit 61 is provided with a DIP switch or the like, the worker selectively sets (specifies) whether each relay module is a master or a slave by manual work, and each relay module can selectively recognize whether the relay module is a master or a slave according to the state of the dip switch. However, by adopting the configuration described above, the burden of the setting work on the worker can be further reduced.

A slave relay module 1i that has recognized that it is a slave outputs signals input in parallel from input signal wires 2i (via the input signal transmission wires 5S) as serial signals in a direction in which the master relay module 1k is connected (upstream) via an interconnection cable 56i (a connector 54i) or an interconnection cable 57i (a connector 55i). At this time, the slave relay module 1i adds a device number (an ID number) uniquely assigned to each relay module to the headers of the serial signals and outputs the serial signals to the upstream side via the interconnection cable 56i or 57i. Therefore, each of the serial signals output from the slave relay module 1i includes at least the device number of the slave relay module 1i, any of the input signals input from the input signal wires 2i and an identification number corresponding to the input signal.

When serial signals generated by another slave relay module 1j (a slave relay module 1j on the downstream side) are input via the interconnection cables 56i or 57i, the slave relay module 1i outputs serial signals generated by the slave relay module 1j and the serial signals generated by the other slave relay module 1i to the upstream side. For example, after the serial signals generated by the slave relay module 1i are output, the serial signals generated by the downstream-side slave relay module 1j are output. Thus, serial signals generated by the slave relay modules 1i and the like can be lined up in order from the upstream side to the downstream side and sequentially transmitted to the upstream side as new serial signals.

Further, each slave relay module may add input signal receiving time to transmit each serial signal to the upstream side.

The order of transmitting serial signals is not limited to the above but can be appropriately changed.

Thus, the master relay module 1k inputs serial signals of all the connected slave relay modules 1a, 1b, . . . , 1m via interconnection cables 56k and 57k.

The master relay module 1k sequentially outputs serial signals generated by the master relay module 1k itself (each of which includes the device number of the master relay module 1k, any of input signals input from the input signal wires 2k and an identification number corresponding to the input signal) and serial signals generated by the slave relay modules 1a, 1b, . . . , 1m to an external apparatus such as the external terminal 28 via the signal wire of an electric cable 53k connected to a connector 52k. That is, the master relay module 1k outputs parallel signals configured with a plurality of input signals input from the input signal wires 2k via the input signal transmission wires 5S and serial signals input from the slave relay modules 1a, 1b, . . . , 1m to the outside via the connector 52 as serial signals.

At this time, for example, an arithmetic processing unit 61k may cause the serial signals of the relay modules to be once stored into its storage device, sequentially read the serial signals from the storage device and output the serial signals to an external apparatus such as the external terminal 28.

Therefore, the external terminal 28 can receive input signals input to all the relay modules 1, distinguishing among the relay modules 1a, 1b, . . . , 1m and among the input signals input to input signal wires 2a, 2b, . . . , 2m of the relay modules 1a, 1b, . . . , 1m.

As described above, the interconnection cables 56 and 57 relay input and output of signals between adjoining relay modules. Therefore, each of the interconnection cables 56 and 57 may be divided into an input cable and an output cable, and each of the connectors 54 and 55 may be divided into an input connector and an output connector to correspond to the input and output cables.

FIGS. 9b and 9c are diagrams in which the relay modules 1 are seen on the input terminal block 4 side. FIG. 9b shows an example in which the plurality of relay modules 1 are connected in the horizontal direction of FIG. 9b (an X direction), and FIG. 9c shows an example in which the plurality of relay modules 1 are connected in the vertical direction of FIG. 9c (a Y direction).

The plurality of relay modules 1 can be linearly coupled with one another by the mutually facing connectors 54 and 55. The direction of coupling can be appropriately adjusted according to arrangement of the connectors 54 and 55 installed on the cases 59 as shown in FIGS. 9b and 9c.

The number of coupled relay modules 1 can be appropriately set to, for example, four, eight or the like, and the maximum number that can be coupled can be decided according to the processing capacity of the arithmetic processing units 61.

Figure 10:
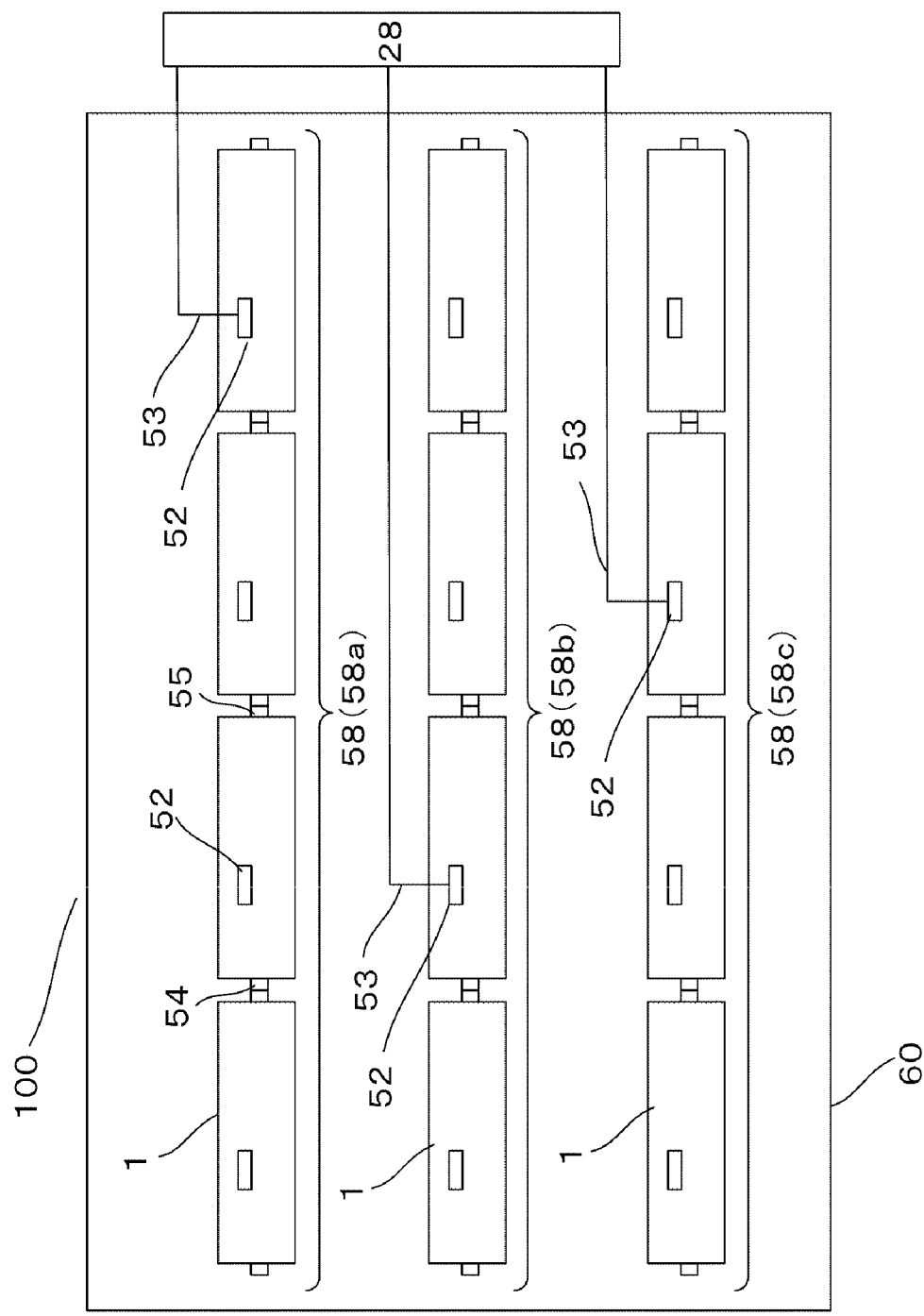
FIG. 10 is a diagram showing a configuration example of groups of the relay modules according to the sixth embodiment of the present disclosure.

As shown in FIG. 10, a plurality of coupled relay modules 1 can be contained in a case 60 to make an expandable relay unit 100. The plurality of relay modules 1 that are mutually coupled via the connectors 54 and 55 constitute relay module groups 58. The plurality of relay module groups 58 can be contained in the case 60.

Each electric cable 53 is connected to an external apparatus (the external terminal 28) existing outside the case 60.

The worker can connect a plurality of relay modules 1 via the connectors 54 and 55 and connect an electric cable 53 to the connector 52 of one relay module.

As a result, one master relay module 1 and slave relay modules are automatically specified for each relay module group 58, and each slave relay module 1 recognizes a direction (a relative position) in which the master relay module 1 exists. Then, such a relay unit 100 can be configured that serially outputs all input signals input in parallel for each relay module group 58 to the external terminal 28 via one master relay module 1.

Therefore, it is possible to significantly reduce the workload of the worker.

One external terminal 28 may be connected to each relay module group 58, or the plurality of relay module groups 58 may be connected to one external terminal 28 as shown in FIG. 10.

Further, though each of all the relay module groups 58 (58*a*, 58*b* and 58*c*) shown in FIG. 10 is configured by coupling four relay modules 1, a different number of relay modules 1 may be coupled. For example, the relay module group 58*a*, the relay module group 58*b* and the relay module group 58*c* may be configured by coupling four relay modules 1, eight relay modules 1 and two relay modules 1, respectively.

In the drawings, for visibility, ground wires may be appropriately omitted, and a plurality of signal wires may be shown as one signal wire.

INDUSTRIAL APPLICABILITY

According to the present disclosure, by adopting the present disclosure for a relay module for central monitoring or the like for performing centralized monitoring, measurement or the like of states of apparatuses at a site, reduction in a wire connection workload for the relay module, shortening of work time and space saving for a remote module are enabled, and the industrial availability is great.

REFERENCE SIGNS LIST

1 Relay module
2 Input signal wire
2S Signal transmission wire
2G Ground wire
3 Terminal
4 Input terminal block
5 Connection wire
5S Input signal transmission wire
5G Input signal ground wire
6 Selective signal transmission device
7 Select signal generation device
8 Connection wire
9 Output signal wire
10 Ground wire
11 Terminal
12 Input/output terminal block
13 Output signal wire
130 Ground wire
137 Select signal transmission wire
139 Output signal transmission wire
14 ADC (analog-digital converter)
15 Substrate (case)
16 Photocoupler
17 Output signal wire
18 Ground wire
19 LED indicator
20 Input/output module
21 Relay terminal block output wire
22 Ground wire
23 Select signal input port
24 Relay module signal input port
25 Arithmetic processing unit
26 Relay terminal block communication port
27 Relay terminal block input wire
28 External terminal
30 Operational amplifier
31 Switch element
32 Select signal wire
33 Load (resistance)
34 Arithmetic processing device (digital signal generation device)
35 LED controller
36 RGB signal wire
37 Output wire
38 Distribution device (demultiplexer)
39 Select signal wire
40 Output signal wire (distribution signal wire)
41 Full color LED
42 Switch element (LED opening/closing element)
50 Connection wire
51 Controller
52 Connector
53 Electric cable
54 Connector
55 Connector
56 Interconnection cable
57 Interconnection cable
58 Relay module group
59 Case
60 Case
61 Arithmetic processing unit
100 Relay unit (relay terminal block)

The invention claimed is:

1. A relay terminal block for relaying a plurality of input signals input from an external measurement apparatus and outputting the plurality of input signals to an external terminal for monitoring or measurement, the relay terminal block comprising:
a relay module; and
a select signal generation device for periodically generating a select signal, wherein the relay module comprises:
a plurality of input signal transmission wires and one output signal transmission wire;
a first connector;
a second connector;
a third connector;
a controller;
a plurality of select signal transmission wires for transmitting the select signal; and
a plurality of terminals to which the select signal transmission wires are connected, wherein
the relay module periodically and sequentially selects one input signal specified by the select signal input via the plurality of terminals, from among the plurality of input signals, and outputs the selected input signal via any of the plurality of terminals and the output signal transmission wire, and wherein
the controller enables signals input via the first connector, the second connector and the input signal transmission wires to be serially output via the third connector when recognizing that the relay module is a master, and enables signals input via the input signal transmission wires to be serially output via the first connector or the second connector when recognizing that the relay module is a slave.

2. The relay terminal block according to claim 1, further comprising an analog-digital converter (ADC), wherein
the selected input signal input to the input signal transmission wire is connected to the ADC, and an output of the ADC is connected to the output signal transmission wire.

3. The relay terminal block according to claim 1, further comprising a plurality of photocouplers, wherein
the input signal transmission wires are connected to respective photocouplers, and
one input signal is periodically and sequentially selected from among signals input via the plurality of photocouplers.

4. The relay terminal block according to claim 1, further comprising LED indicators, wherein
the input signal transmission wires are connected to the respective LED indicators.

5. The relay terminal block according to claim 1, wherein
the relay module recognizes that the relay module is a master when detecting that there is external connection at the third connector, and recognizes that the relay module is a slave when detecting that there is no external connection at the third connector.

6. A relay terminal block comprising a plurality of the relay terminal blocks according to claim 1, wherein
at least the first connector of each of the relay modules is electrically connected to the second connector of another relay module adjoining to the relay module, or the second connector of the relay module is electrically connected to the first connector of another relay module adjoining to the relay module.

7. The relay terminal block according to claim 6, wherein
one of the plurality of relay modules electrically connected to one another via the first connector or the second connector is specified as a master relay module, and the other relay modules are specified as slave relay modules,
the slave relay modules serially output signals input via the input signal transmission wires to the master relay module side via the first connector or the second connector, and
the master relay module serially outputs signals input via the input signal transmission wires and input signals input via at least one of the first connector and the second connector, via the third connector.

8. A relay terminal block comprising a relay module for relaying an input signal and outputting the input signal to the external terminal by being connected to the relay terminal block according to claim 1, wherein
the relay module comprises:
a plurality of input signal transmission wires and one output signal transmission wire; and
a plurality of select signal transmission wires for transmitting the select signal, wherein
the relay module periodically and sequentially selects one input signal specified by the select signal, from among the plurality of input signals, and outputs the selected input signal via the output signal transmission wire.

* * * * *